(12) United States Patent
McCauley (10) Patent No.: US 7,279,799 B1
(45) Date of Patent: Oct. 9, 2007

(54) MOTOR VEHICLE DRIVEN DEVICE FOR OPERATING A PORTABLE ELECTRIC GENERATOR

(75) Inventor: Lester F. McCauley, Fort Myers, FL (US)

(73) Assignee: DHLMC, Inc., Fort Myers, FL (US)

( * ) Notice: Subject to any disclaimer, the term of this patent is extended or adjusted under 35 U.S.C. 154(b) by 0 days.

(21) Appl. No.: 11/216,573

(22) Filed: Aug. 31, 2005

Related U.S. Application Data (60) Provisional application No. 60/605,506, filed on Aug. 31, 2004.

(51) Int. Cl.
*F03B 63/04* (2006.01)
*F03G 7/08* (2006.01)
*H02K 7/18* (2006.01)
*H02P 15/00* (2006.01)

(52) U.S. Cl. .......................... 290/1 R; 322/40
(58) Field of Classification Search ............... 290/1 R; 417/229; 60/325; 322/40; 180/53.61; 73/117
See application file for complete search history.

(56) References Cited

U.S. PATENT DOCUMENTS

| | | | | |
|---|---|---|---|---|
| 2,712,109 A | * | 6/1955 | Graziose | 322/42 |
| 2,716,728 A | * | 8/1955 | Lester | 322/40 |
| 2,749,747 A | * | 6/1956 | Cline | 73/117 |
| 3,148,549 A | * | 9/1964 | Mohamed | 74/1 R |
| 3,411,346 A | * | 11/1968 | Gagliardi | 73/117 |
| 3,859,589 A | * | 1/1975 | Rush | 322/40 |
| 3,943,370 A | * | 3/1976 | Watanabe | 290/1 R |
| 4,048,511 A | * | 9/1977 | Watanabe | 290/1 R |
| 4,239,975 A | * | 12/1980 | Chiappetti | 290/1 R |
| 4,437,015 A | * | 3/1984 | Rosenblum | 290/1 R |
| 5,086,857 A | * | 2/1992 | Dale | 180/53.4 |
| 5,522,257 A | * | 6/1996 | D'Angelo et al. | 73/117 |
| 5,844,145 A | * | 12/1998 | D'Angelo | 73/862.18 |

* cited by examiner

*Primary Examiner*—Julio C. Gonzalez
(74) *Attorney, Agent, or Firm*—William E. Noonan (57) ABSTRACT

An electric generator device powered by a driving wheel of a motor vehicle. The device includes a base for supporting an electric generator. An idler roller assembly includes at least one load bearing idler roller mounted rotatably to the base for circumferentially engaging and supporting a driving wheel of a motor vehicle. A drive roller is mounted rotatably to the base for maintaining non-bearing circumferentially tangential interengagement with the driving wheel such that rotation of the wheel causes the drive roller to axially rotate. The drive roller is operably connected to the generator such that axial rotation of the drive roller is transmitted to the generator and the generator is operated to produce electricity.

17 Claims, 5 Drawing Sheets

MOTOR VEHICLE DRIVEN DEVICE FOR OPERATING A PORTABLE ELECTRIC GENERATOR

RELATED APPLICATION

This application claims the benefit of U.S. Provisional Patent Application Ser. No. 60/605,506 filed Aug. 31, 2004.

FIELD OF THE INVENTION

This invention relates to a device that converts the rotation of a motor vehicle's driven wheel into power for driving a portable electric generator so that the generator may be operated without requiring its own gasoline-powered engine.

BACKGROUND OF THE INVENTION

Portable electric generators are widely used during hurricanes, storms and other occasions when conventional power supplies are disrupted. Such generators may be vital for providing the electricity needed to power pumps, refrigerators, air conditioning systems and various other machines and appliances. Portable generators are also commonly used to provide electricity for camping and at other remote locations where standard electric utilities are not available.

Most conventional portable electric generators are powered by a gasoline engine. An ample supply of gasoline must be kept on hand and, during use the fuel tank of the generator must be periodically refilled. A generator used to power major appliances of the home tends to burn fuel quite quickly. Operating the generator for a significant period of time can therefore be quite expensive. This cost has been exacerbated by increasing fuel prices. Constantly refueling the generator and purchasing additional fuel to keep the generator running tends to be time consuming, tedious and sometimes arduous work. If the available supply of gasoline dwindles, such as during an emergency, operating the generator becomes even more problematic. By the same token, maintaining a supply of gasoline large enough to avoid operating interruptions is often impractical and, at a minimum, inconvenient for most individuals and businesses. In addition, for safety reasons, the generator must be allowed to cool before it is re-fueled. This interrupts operation of the generator even longer. If the user does not wait a sufficient time for the generator to cool, adding fuel can present a dangerous risk of explosion and/or fire.

Conventional portable generators also tend to be very large and bulky. The gasoline engine takes up considerable space and adds a great deal of weight to the generator. Such generators are very inconvenient to store, particularly in a small garage or other constricted storage space. The weight and bulk of many generators makes them far from optimally portable. Instead, it is often awkward, difficult and inconvenient to transport such equipment.

Most portable generators are furthermore quite noisy due to operation of the generator's gasoline engine. For this reason and also because of the noxious fumes emitted by the gasoline engine as it operates, most generators are set-up as far away as possible from the living space being serviced by the generator. Even then, the typically loud operation of the engine can be quite annoying and distracting to nearby persons. Noise pollution can be particularly annoying in residential environments.

A number of known devices attempt to convert the rotation of a motor vehicle's wheel into power for operating a generator. However, these known devices exhibit various difficulties. Most of them require the weight of the motor vehicle to rest directly or almost directly upon a roller that is, in turn, driven to operate the generator. This does not allow for optimally smooth and unhindered rotation of the drive roller. In addition, prior motor vehicle powered generators are effective with only a single tire or wheel size. Today, tires for motor vehicles come in a wide range of diameters. In an emergency situation, it is almost mandatory that the generator be able to work with various wheel sizes.

Known motor vehicle driven electric generator devices also tend to be fairly large and unwieldy. Most are permanently installed in a garage or other location. They are not suitable or convenient for use with portable generators and are particularly inappropriate for use at a campsite or other remote location.

SUMMARY OF THE INVENTION

It is therefore an object of the present invention to provide an improved apparatus for using a driving wheel of a motor vehicle to power and operate an electric generator.

It is a further object of this invention to provide a generator drive apparatus utilizing a non-load bearing drive roller that is driven smoothly by the wheel of a motor vehicle and, without binding, to provide a constant level of uninterrupted power to the generator.

It is a further object of this invention to provide an apparatus that is readily adjustable so that a variety of motor vehicle wheel sizes may be used for supplying power to an electric generator.

It is a further object of this invention to provide an electric generator drive apparatus that is conveniently portable and which may be readily transported to and used in a wide variety of remote locations.

It is a further object of this invention to provide an electric generator drive apparatus, which features a far simpler construction and which operates more reliably than previous products of this type.

It is a further object of this invention to provide an electric generator drive apparatus, which employs relatively few replaceable and/or serviceable parts and which is easy to maintain.

It is a further object of this invention to provide a device for powering a portable electric generator, which is compact, lightweight and extremely easy to use.

It is a further object of this invention to provide a device for powering a portable electric generator that may be used effectively and reliably with a virtually all available brands of generators.

It is a further object of this invention to provide a portable generator that operates much more quietly than conventional generators.

It is a further object of this invention to provide a portable generator, which does not require its own gasoline engine and which eliminates the problems typically exhibited by conventional portable electric generators.

It is a further object of this invention to provide a portable generator that does not require frequent, tedious and expensive refueling.

It is a further object of this invention to provide a portable generator that is far less expensive to operate, weighs less and is quieter running than previously available portable electric generators.

It is a further object of this invention to provide a portable generator that does not generate noxious and/or foul smelling fumes.

It is a further object of this invention to provide an electric generator that is quite lightweight and easy to set-up, disassemble and transport as required.

This invention results from a realization that the drive roller of a motor vehicle powered device for operating an electric generator operates much more smoothly and yields a constant level of electric power in an uninterrupted fashion if the circumference of the vehicle driven wheel is maintained in circumferentially tangential, non-load bearing interengagement with the driven roller and the weight of the vehicle wheel is instead borne by separate idler rollers that support the driven wheel. The invention results from a further realization that the idler rollers may be adjusted toward and away from the drive roller to accommodate respective motor vehicle wheel sizes.

This invention features a device for powering an electric generator. The device includes a base for supporting the generator. There is an idler roller assembly including at least one load bearing idler roller mounted rotatably to the base for circumferentially engaging and supporting a driving wheel of a motor vehicle. A drive roller is mounted rotatably to the base for maintaining non-load bearing circumferentially tangential interengagement with the driving wheel of the motor vehicle such that rotation of the wheel causes the drive roller to axially rotate. The drive roller is operably connected to the generator such that axial rotation of the drive roller is transmitted to the generator and the generator is operated to produce electricity.

In a preferred embodiment, the idler roller assembly includes a pair of idler rollers that are arranged axially parallel to one another. The drive roller may be mounted on the base above and forwardly of the idler roller assembly. The idler roller assembly may also include a carriage that is movably supported in the base. An adjustment mechanism may be operated to adjust the carriage within the base and position the idler roller assembly a selected distance from the drive roller. The selected distance permits a driving wheel of a corresponding size to operably interengage and rotate the drive roller. The adjustment mechanism may include a threaded element that interengages the base and the carriage, and a nut fixed to one of the base and the carriage. The nut operably engages the threaded element such that axially turning the threaded element in a first direction adjusts the carriage and the idler roller assembly toward the drive roller. Turning the threaded element in an opposite second direction adjusts the carriage and the idler roller assembly away from the drive roller.

A wheel size indicator system may be employed. This system includes a marker carried by one of the idler roller assembly and the base. The system further includes a series of wheel size indicators attached to other of the idler roller assembly and the base. The carriage is adjusted to align the marker with the selected wheel size indicator. As a result, a motor vehicle driving wheel having a corresponding wheel size is positionable on the idler roller assembly to operably engage and rotate the drive roller in a circumferentially tangential and non-load bearing manner. The base may include an outer frame and the carriage may include an inner frame that is slidably mountable in the outer frame. A ramp is attached to the base for supporting the driving wheel of the motor vehicle as that driving wheel is driven onto the idler roller assembly.

A reduction mechanism may operably interconnect the drive roller and the generator. The reduction mechanism typically includes a first pulley attached axially to the drive roller, a second pulley attachable axially to the generator and a drive belt interconnecting the first and second pulleys. A cage or other form of housing may be provided to enclose the reduction mechanism.

A wheel assembly may be mounted rotatably to a first side of the base and a handle assembly may be mounted to an opposite, second side of said base. The handle assembly is grasped by a user of the device and the wheel assembly engages and rolls along an underlying surface to facilitate transport of the device.

DETAILED DESCRIPTION OF PREFERRED EMBODIMENTS

Other objects, features and advantages will occur from the following description of a preferred embodiment and the accompanying drawings, in which.

Figure 1:
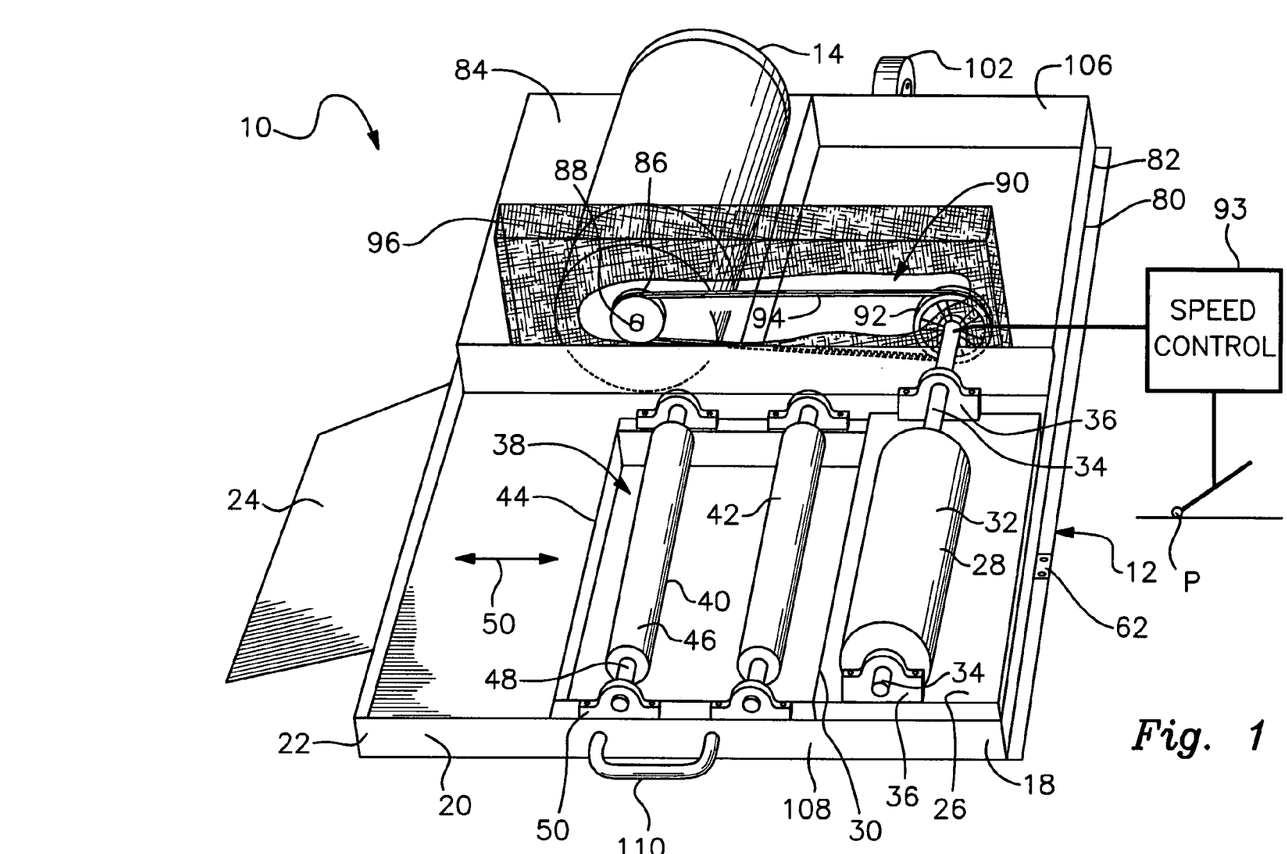
FIG. 1 is a perspective view of a preferred version of the motor vehicle driven device for powering an electric generator in accordance with this invention.
Figure 2:
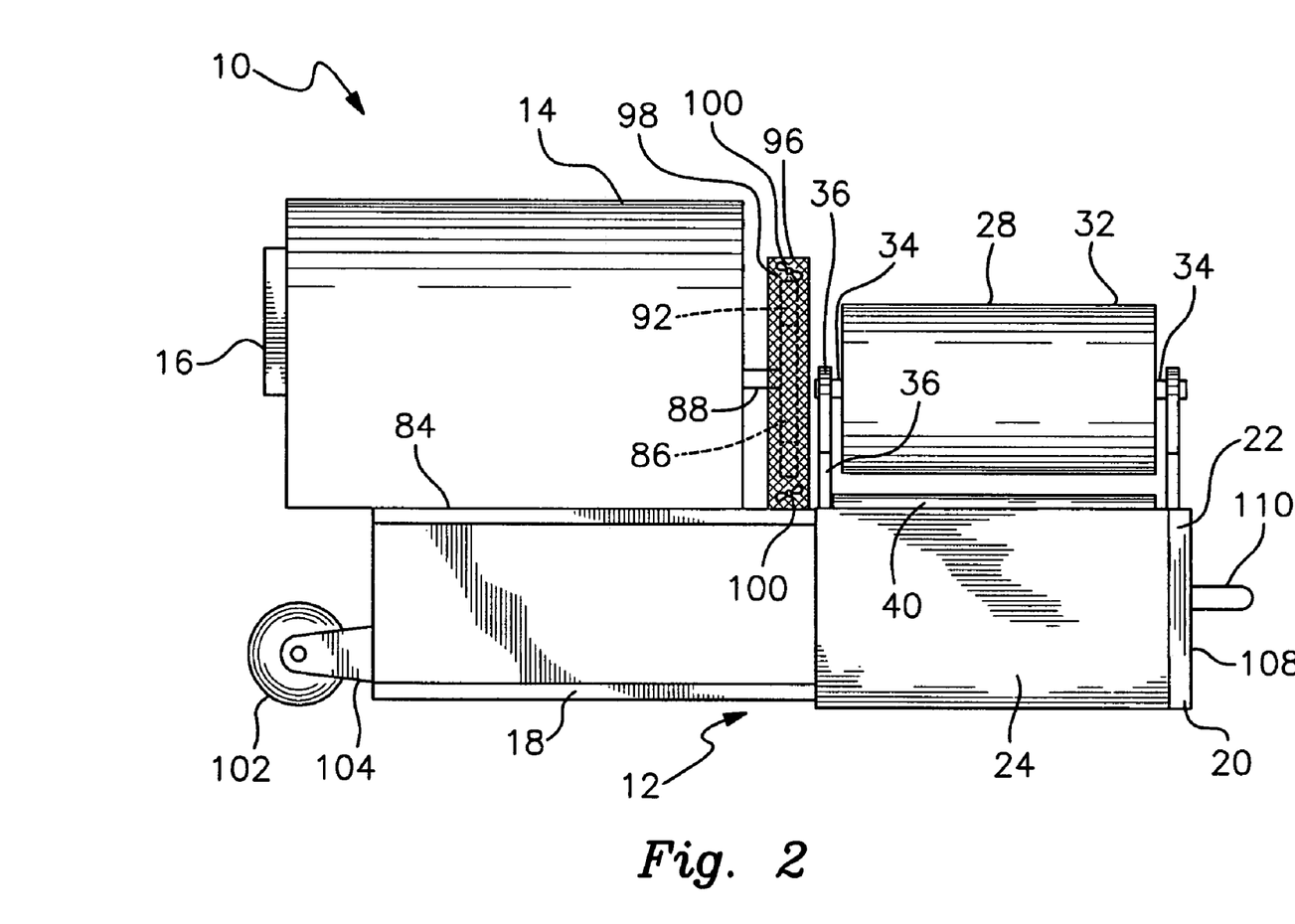
FIG. 2 is an elevational first view of the device.

There is shown in FIGS. 1 and 2, a portable electric generator system 10, which utilizes a motor vehicle driven device 12 for providing power to a standard portable electric generator 14. The portable generator may have various sizes and capacities within the scope of this invention. System 10 may incorporate various known types of generators. Alternatively, the entire system 10 may be constructed and sold with its own generator 14 that is adapted to be powered by the drive system 12. Generator 14 may be equipped with its own electrical outlet 16, FIG. 2, which is connects one or more power cords to the generator in a known manner. The particular structural details of the generator per se should be well known to persons skilled in the art and do not constitute a part of this invention.

Generator driver device 12 includes a base 18 comprising a frame-like structure composed of extruded aluminum pieces or similar components. A right-hand section 20 of the base includes a rectangular frame section 22. This frame section is several inches deep. An inclined ramp 24 is attached to the leading or front end of frame section 22 and extends between the ground, driveway or other underlying surface and an upper edge of the frame. This ramp facilitates introduction of a motor vehicle's driving wheel onto device 12. This operation is described more fully below. The ramp is typically composed of a durable metal such as aluminum or steel. Typically, the base and the ramp will be composed of similar material. Strong and durable, but lightweight aluminum is particularly preferred to facilitate transport of the device and to minimize damage and repair. Other metals, metal alloys and plastics may be employed.

The opposite end of frame section 22 carries an upper platform 26 that is mounted to the upper edge of the frame above section 22. A drive roller 28 is axially rotatably mounted on platform 26 proximate a front edge 30 of the platform. More particularly, drive roller 28 includes an elongate roller section 32 having a length of approximately 8"-12" and an outside diameter of approximately 3½". Roller section 32 is mounted by a roller shaft 34, which is about 18" long, to respective pillow bearings 36 that are in turn fastened to the upper surface of platform 26. Preferably, roller section 32 and shaft 34 of roller 28 comprise a unitary, molded plastic, polyurethane or rubber construction which is durable and fairly lightweight. In alternative embodiments, the shaft and roller section may comprise separate and distinct components and may be composed of various durable materials. In either case, opposing ends of shaft 34 rotatably engage respective bearings 36. Known varieties of bearings may be employed and the bearing may utilize grease fittings to facilitate rotation of the drive roller within the bearings. In all versions, the roller section 32 should be fixed to the shaft 34 so that rotation of the drive roller is transmitted to the generator in a manner described more fully below.

Frame section 22 is open between ramp 24 and platform 26. An idler roller assembly 38 is operably mounted within this open space. In particular, idler roller assembly 38 includes a pair of idler rollers 40 and 42 that are mounted on an adjustable carriage 44 located within the open space of frame section 22. The idler roller assembly is shown in greater detail in FIG. 3. Each of the rollers 40 and 42 comprises an elongate roller section 46 that is mounted by a central shaft 48 between a pair of pillow bearings 50 carried on respective sides of carriage 44. The rollers 40 and 42 extend laterally across carriage 44 and are parallel to one another. As with the drive roller, each of the idler rollers 40, 42 preferably includes a molded one-piece plastic construction. In other versions, the roller section may be separate from and fixed to the shaft such that the roller section and shaft rotate together within the opposing pillow bearings. Other types of bearings may be used within the scope of this invention.

Carriage 44 comprises a rectangular frame that is constructed of a durable metal or metal alloy such as steel or aluminum. Carriage 44 is slidably mounted within the extruded framework section 22 of base 18. The side rails of the carriage interengage respective parallel L-shaped extrusions forming the sides of frame section 22. As a result, the carriage and roller assembly 38 are able to slide back and forth within frame section 22, as best indicated by double-headed arrow 51 in FIGS. 1 and 3.

Idler rollers 40, 42 have a size and configuration that generally resembles that of the drive roller. Each of the idler rollers may have an outer diameter of approximately 2½"-3". In certain versions, all three rollers may have an identical shape and configuration such that the rollers are interchangeable. This feature also enables modular rollers to be used so that the rollers can be readily replaced as needed. Preferably, a pair of idler rollers are used although other numbers may be employed within the scope of this invention. It is important to position the idler rollers within frame section 22 of base 18 so that the upper surface of the roller projects above the upper edge of frame section 22. See FIG. 2. As a result, rollers 40, 42 provide load-bearing support for the wheel and tire of a motor vehicle that is driven onto device 12. In all cases, the idler roller should be positioned forwardly and somewhat below drive roller 28. See FIGS. 1, 2 and 4.

Figure 4:
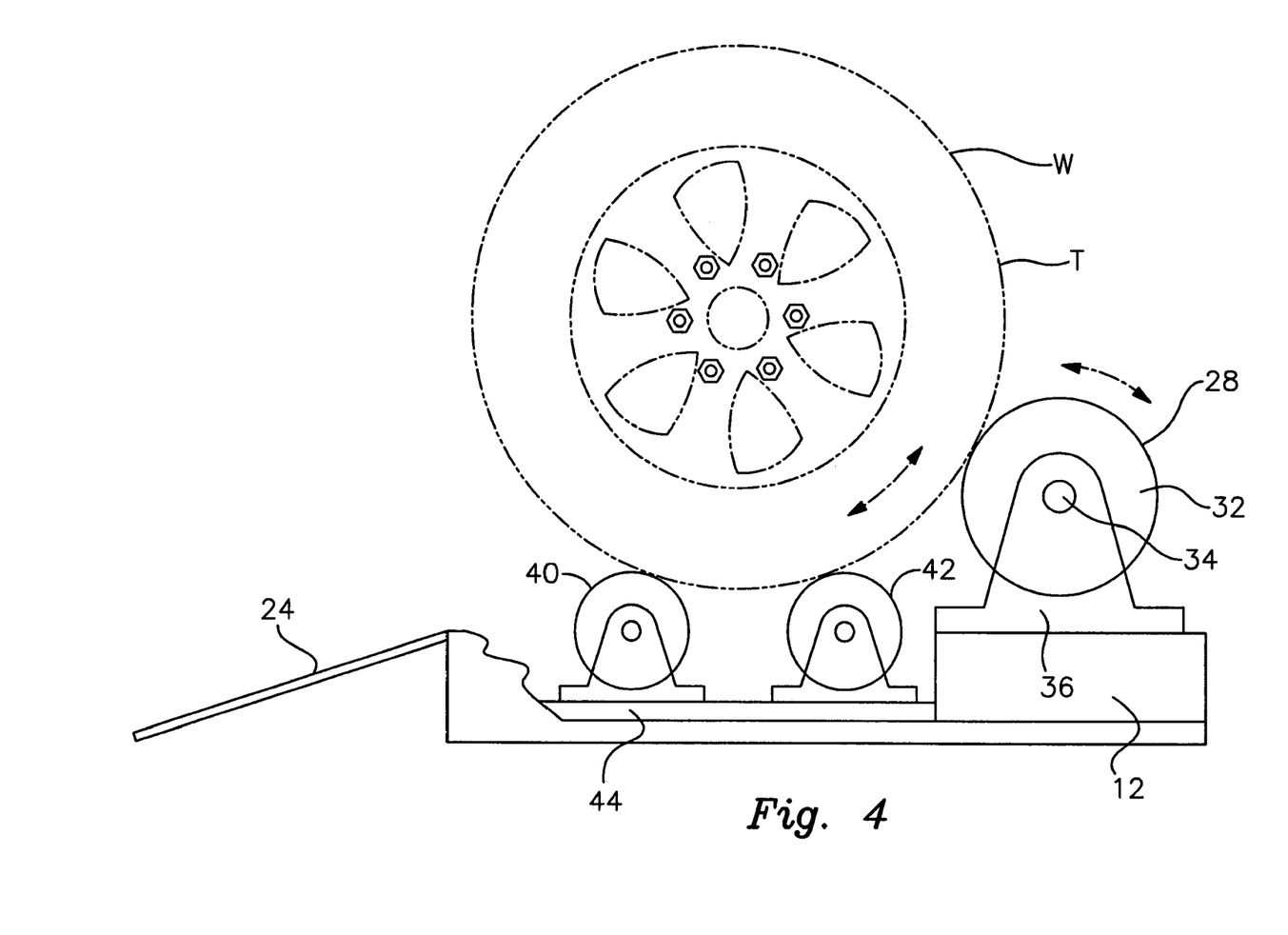
FIG. 4 is an elevational side view of the idler rollers and drive roller with a motor vehicle wheel shown in operative interengagement with the rollers.

Drive roller 28 is positioned proximate forward edge 30 of platform 26. Its location should be such that the circumferential surface of the tire of an automobile or other vehicle that is driven onto device 12 interengages the drive roller in a circumferentially tangential, non-load bearing manner. FIG. 4 depicts an automotive wheel W with the circumferential surface of tire T tangentially engaging the circumferential surface of drive roller 28. Idler rollers 40, 42 are positioned beneath wheel W and provide load-bearing support for the wheel. Conversely, the circumference of tire T engages the circumference of roller 28 tangentially only and in a non-load bearing manner. This provides important benefits as are described more fully below. It is important that this positioning be provided so that rotation of the motor vehicle's wheel transmits power smoothly, efficiently and effectively, in an uninterrupted fashion to the generator. Such operation is likewise described more fully below.

Figure 3:
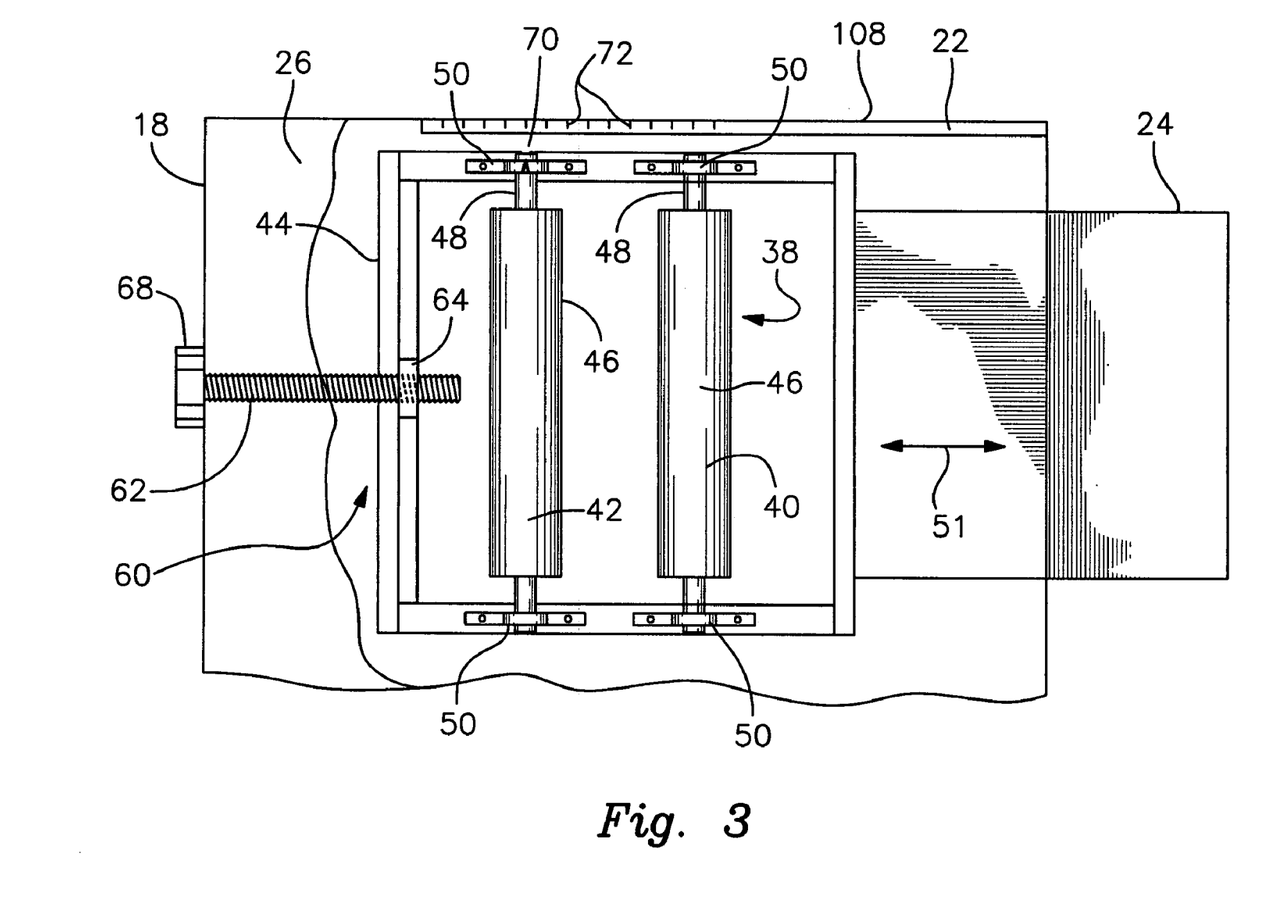
FIG. 3 is a plan and partially cut away view of the adjustable idler roller assembly mounted in the base; the drive roller is omitted for clarity.

Proper positioning of the motor vehicle's wheel on device 12 is accomplished through the use of the adjustment mechanism 60 shown in FIG. 3. In particular, adjustment mechanism 60 comprises a threaded element or bolt 62 that is mounted through an opening in the trailing end of base 18. Element 62 extends through an aligned opening in carriage 44 and threadably interengages a nut 64 that is fixed to the carriage.

With the carriage properly and slidably engaged with frame section 22, as previously described, threaded element 62 is operated to selectively adjust the carriage toward and away from the drive roller 28. In FIG. 3 the drive roller is omitted for clarity but is positioned generally above the threaded element 62 on platform 26. To adjust the carriage and roller assembly 38, the user rotates the head 68 of threaded element 62 in a selected direction. By turning the head 68 in one direction (clockwise), the carriage and its accommodated idler rollers are pulled toward the drive roller (i.e. to the left in FIG. 3 and to the right in FIG. 1). When the threaded adjustment element 62 is turned in the opposite (counterclockwise) direction, the threaded element rotates through the nut 64 and adjusts the carriage and roller assembly 38 away from the drive roller. In this manner, the position of the carriage and idler rollers within frame section 22 may be adjusted back and forth as indicated by double-headed arrow 51.

The foregoing adjustment is important because it allows virtually all sizes of vehicle wheels and tires to be used with device 12. For example, vehicles that utilize 14" tires must be positioned fairly close to drive roller 28 so that the circumference or tread of the tire circumferentially tangentially engages the outer surface of roller 28 in a non-load bearing manner (i.e. in the manner shown in FIG. 4). When the motor vehicle has larger tires, the carriage 44 and idler rollers 40, 42 must be adjusted away from the drive roller so that the above described tangential non-bearing interengagement is maintained between the outer surface of the tire and the circumferential surface of the drive roller. Adjustment mechanism 60 allows for the carriage and the idler roller assembly to be correctly positioned to accommodate virtually all sizes of motor vehicle wheels and tires.

An indicator system is provided to facilitate accurate positioning of the idler roller assembly for respective sizes of tires. In particular, this system includes a marker 70 that is carried by one of the idler roller bearings 50 located proximate the side extrusion 108 of frame section 22. This marker may be placed at other locations on the carriage or one of the idler rollers 40, 42. A complementary series of indicator lines comprising a scale 72 is formed along the upper surface of the outer side of frame section 22. Adjacent to the outer idler roller bearings 50. These indicator lines represent the respective positions at which the idler roller assembly should be set to accommodate corresponding sizes of tires. For example, as shown in FIG. 3, when marker 70 is set adjacent to the left-hand indicator line of scale 72, this sets the carriage and idler roller assembly for accommodating a 14" tire. By adjusting the carriage within frame section 22 in the previously described manner, the carriage may be moved so that marker 70 aligns with a selected one of the other indicator lines of scale 72. This sets the carriage 44 and idler roller assembly 38 for use with respectively larger sizes of tires. Once again, the idler rollers are moved farther away from the drive roller in order to use the device with larger tires. In each case, the adjustment is preformed by operating mechanism 60 in the previously described manner. In other versions, the marker may be formed on the base and the indicator scale may be printed on the carriage.

As further shown in FIG. 1, base 18 includes an opposite, second half section 80 that once again includes a generally rectangular frame section 82. As with frame section 22, frame section 82 typically comprises a lightweight, yet durable metal or metal alloy. High strength aluminum extrusions are particularly preferred. A platform 84 covers some or all of frame section 82. In the version shown herein, platform 84 is mounted to the upper edge of one half of frame section 82. Platforms 26 and 84 may be secured to the extrusion of the underlying frame by appropriate means such as welding, bolts, etc. Platform 84 supports portable electric generator 14. The generator is typically mounted to the platform by means of attachment such as bolts formed through complementary openings in platform 84 and secured by respective bolts. These openings may be sized so that the position of the generator may be adjusted slightly on the platform. This enables the tension of the belt to be adjusted and also allows the belt to be changed when needed in a manner described more fully below.

As previously described, generator 14 is provided with various standard outlets and connections that allow the generator to be operably connected to assorted appliances. A pulley 86 is axially rotatably joined to generator shaft 88. This shaft is in turn connected to the generator in a standard manner such that as the shaft rotates the generator is driven to produce electricity, which is, in turn, delivered through an attached power cord (not shown) to appliances connected to the generator.

Power is transmitted from the rotating drive shaft 28 to generator 14 through a reduction mechanism 90. The reduction mechanism is configured so that rotation of the motor vehicle's driving wheel is converted to turn the generator shaft at the rotational speed necessary to operate the generator to produce a needed level of power. In the version disclosed in FIGS. 1-4, the reduction mechanism includes a first pulley 92 that is axially rotatably connected to shaft 34 of drive roller 28. An endless drive belt 94 operably interconnects pulley 92 and generator pulley 86. The relative sizes and distance between pulleys 86 and 92 may be varied within the scope of this invention in order to convert a particular driving wheel speed (in revolutions per minute or RPMs) to a desired generator speed. In the particular version shown in FIGS. 1-4, pulley 92 has a diameter of 8½" and pulley 86 has a diameter of 2½". Nonetheless, these dimensions may be varied within the scope of this invention to produce a desired generator speed and output.

Reduction mechanism 90 is enclosed within a housing 96 that is mounted on platform 84 of frame section 82. Housing 96 comprises a rectilinear cage that is composed of steel or other rugged and stress-resistant material. The mesh-like construction of the cage provides the user with a clear view of pulleys 86, 92 and drive belt 94. The cage-like construction also ventilates the belt and allows heat to be dissipated from the reduction mechanism as it is operated. As best shown in FIG. 2, a door panel 98 may be removably mounted to one end of the cage. The door panel is secured to the cage by appropriate attachment means such as wing nuts 100, which are secured to threaded elements (not shown) projecting from cage 96. If belt 94 and/or pulleys 86 and 92 require repair or replacement, they are accessed by simply removing door 98 of cage 96. The position of generator 14 is then adjusted slightly to loosen or remove the drive belt. The belt can then be replaced and the generator repositioned to retightened the belt.

To facilitate transport of system 10, a pair of wheels or casters 102, FIGS. 1 and 2, are mounted to base 12. More particularly, wheels 102 are mounted in respective brackets 104 that are swivelably attached to and extend from the side extrusion 106 of frame section 82. Wheels 102 are spaced apart along extrusion 106 and are positioned on the extrusion such that each wheel 102 engages or is proximate to the ground when system 10 is set up in the operating condition shown in FIGS. 1 and 2. The opposite side extrusion 108, which forms the outer side of frame section 22, carries a handle 110. To transport system 10, the user simply grasps handle 110 and pivots the system upwardly about wheels 102. The user can then conveniently transport the generator system by pulling the handle and rolling system 10 along wheels 102.

In operation, generator system 10 is transported to and/or positioned in a desired location. In particular, system 10 should be placed at a location that is conveniently assessable to the external power cords and/or appliances, which will require electricity from generator 14. This location should also be accessible to a motor vehicle. Accordingly, system 10 is typically set-up in or near a garage, driveway, roadway, campsite or other outdoor and/or well ventilated location.

After system 10 is assembled, a motor vehicle is introduced onto drive device 12. Initially, idler roller assembly 38 is adjusted within frame section 22 to accommodate the particular wheel/tire size of the vehicle. This is accomplished by moving carriage 44 back and forth, as required, in the directions indicated by doubleheaded arrow 51 as previously described. Marker 70 is aligned with the appropriate indicator line of scale 72. The motor vehicle is then carefully driven forwardly or rearwardly such that the driving wheel W, FIG. 4, rolls up ramp 24 and onto idler rollers 40,42. The circumferential surface of tire T tangentially engages the outer surface of drive roller 28 in a non-load bearing manner. When the motor vehicle is a front wheel drive vehicle, it is driven forwardly onto the drive device 12 in the above described manner so that a front driving wheel of the vehicle engages the rollers as shown in FIG. 4. Alternatively, when a rear drive vehicle is involved, the vehicle is backed up ramp 24 and onto the drive apparatus so that a rear driving wheel of the vehicle engages the rollers.

After the applicable driving wheel of the motor vehicle is securely installed in the drive apparatus 12 and properly engaged with rollers 40, 42 and 28, the vehicle is operated at idle speed. Wheel W rotates in either a clockwise direction or counterclockwise direction. The direction of the wheels' rotation can vary depending upon whether the wheel is a front or rear wheel and further depending upon whether it is driven in a forward or reverse direction. In either case, wheel W and its tire T rotate over idler rollers 40, 42 and the tire circumferentially tangentially engages roller section 32 or drive roller 28. This causes the axially connected drive roller shaft 34 to rotate, which in turn rotates drive pulley 92. The drive pulley operates belt 94 so that generator pulley 86 is rotated. This in turn rotates shaft 88, which drives generator 14 in a standard manner to produce electricity. The level of electricity produced depends upon the capacity of the generator and the speed in RPMs of the generator shaft 88. By properly configuring the size of the drive roller and reduction mechanism, an engine idle speed of approximate 1,000-

1,300 RPMs can produce a generator shaft speed of up to 3,600 RPMs, which is capable of operating a 25,000 watt generator. Assorted generator sizes and capacities may be employed within the scope of this invention.

The generator system of this invention provides for significant advantages over the prior art. A motor vehicle running at idle speed consumes far less gasoline when operating a generator of a particular capacity through system 10 than does the standard gasoline driven engine normally used for such a generator. The amount of fuel used by system 10 and the attendant cost for such fuel are only approximately ⅓ those of a comparable size gasoline powered generator. Because fuel is consumed much more gradually, the need for costly and annoying refuelings is reduced. The generator system of this invention is also far quieter than standard gasoline powered generators. The system is much less distracting and annoying to nearby persons, who can conduct normal conversations over the generator without having to continuously shout.

The present generator system is also far superior to standard motor vehicle driven generators for several reasons. Significantly, drive roller 28 is engaged by the driving wheel of the vehicle in a non-loading bearing manner. Because the drive roller is circumferentially tangentially driven by the wheel, it is not apt to bind, jam and/or malfunction. Rather, a free, uninterrupted rotation and reliable operation are exhibited and a dependably constant level of electricity is generated.

The present invention is quickly and conveniently adjustable so that virtually all sizes of motor vehicles may be used to operate the generator. This is a significant improvement over conventional motor vehicle driven generators wherein the rollers are not adjustable and can not be used readily with different sizes of tires.

By the same token, the present invention allows the drive roller and generator to be driven in either a forward or reverse direction to produce the needed electricity. Virtually all known motor vehicle driven generators are unidirectional system and are able to be used with either a front wheel or a rear wheel driven vehicle but not both types of motor vehicles. Generator system 10 enables a front wheel drive vehicle to be driven in either forward or reverse directions and a rear vehicle to similarly be driven in either forward or reverse directions. As a result, the present invention is far more versatile than conventional systems wherein only a single direction of operation is disclosed.

System 10 employs a simple, yet durable and easy to maintain construction. High strength aluminum extrusions and steel are utilized so that the drive system is virtually damage-proof. Modular and easy to replace rollers and bearings allow the user to make changes quickly and conveniently when needed. The lightweight construction and maneuverability of this system, particularly through the use of the wheels 102 and handle 110 make the system particularly convenient to be transported to remote locations. A relatively lightweight construction is employed such that system 10 is much lighter weight and more easy to transport than standard portable generators.

Figure 5:
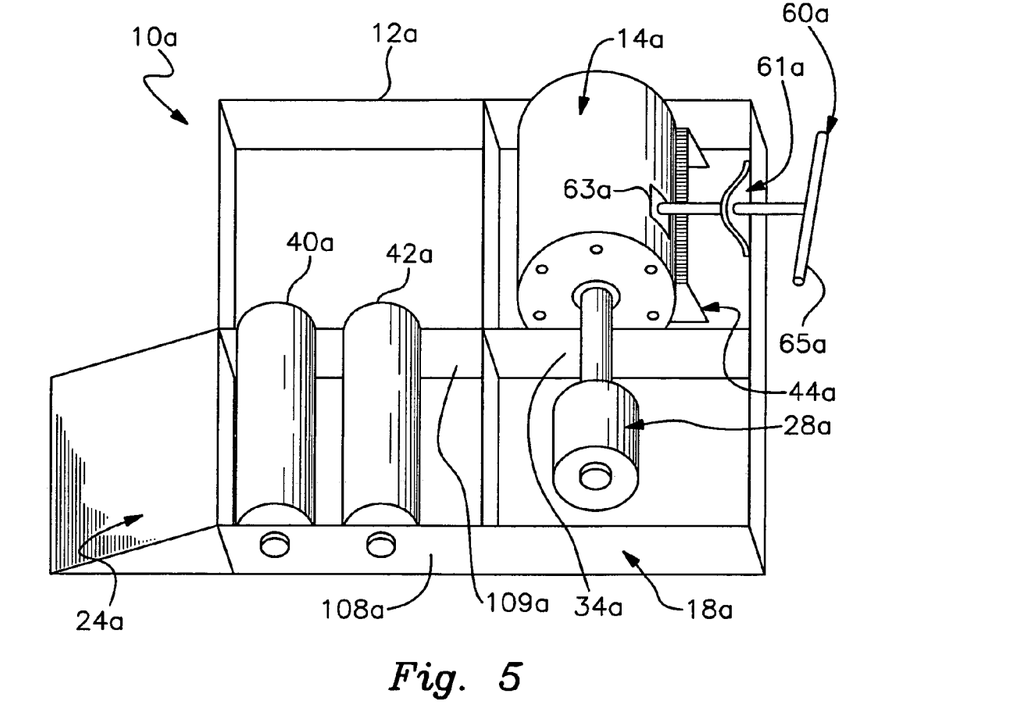
FIG. 5 is a perspective view of an alternative version of the device of this invention employing a direct axial interconnection between the drive roller and the generator.

In the alternative version shown in FIG. 5, generator system 10a again includes a drive apparatus 12a for powering a generator 14a through the use of a standard motor vehicle, not shown. Apparatus 12a includes a base 18a comprising an extruded aluminum frame similar in construction to the component previously described. A pair of idler rollers 40a, 42a are rotatably mounted between extrusions 108a and 109a. Alternatively, the rollers may be mounted to bearings in the manner previously described.

A drive roller 28a is operably interconnected by a shaft 34a to portable generator 14a. In this version, a reduction mechanism is not employed, although such a reduction mechanism may be utilized in other versions of this embodiment as well. It should also be noted that in either embodiment of this invention, the reduction mechanism may feature standard reduction components such as other tooth gears, gears in chains, gear and chain drives, etc.

Generator 14a is mounted adjustably within base 18a. In particular, the generator may be mounted on an extruded carriage 44a that is itself slidably mounted within base 18a. An adjustment apparatus 60a may be interengaged through a bushing 61a carried by base 18a. The inner end of adjustment device 60a includes an engagement plate 63a that interengages generator 14a. A handle 65a at the outer end of apparatus 60a is selectively turned in clockwise and counterclockwise directions to move generator 14a back and forth on carriage 44a within base 18a. This adjustment is performed in a manner analogous to the adjustment in the previously described embodiment so that system 10a may be assembled to accommodate the particular size of the motor vehicle's wheel/tire. If a smaller tire is being used, the adjustment device 60a will be operated to push the generator in a left-hand direction so that the drive roller 28a is drawn closer idler rollers 40a, 42a. Alternatively, the larger wheel/tire being used, the adjustment device is operated in the opposite direction so that the drive roller 28a is moved away from idler rollers 40a, 42a. In either case, the drive roller is supported forwardly and above the idler rollers in a configuration analogous to that previously described. The drive roller should be oriented relative to the idler rollers such that when a motor vehicle is driven onto the idler rollers, the outer edge of the driving tire circumferentially tangentially engages roller 28a in a non-load bearing manner.

The second version of this invention operates in a manner that corresponds to that described in the prior embodiment. Initially, the position of the generator and drive roller are adjusted to accommodate the particular wheel/tire size of the vehicle that will be used to power the generator. The vehicle is then driven so that the driving wheel rolls up ramp 24a and onto idler rollers 40a, 42a. The tires should then be in non-load bearing circumferentially tangential engagement with drive roller 28a. The motor vehicle is then operated at idle speed so that the rotating tire interengages and drives roller 28a. This in turn rotates shaft 34a so that generator 14a is operated in a standard manner to produce electricity. Such electricity is then made available to accessories and power cables that are attached to the generator. Generator 10a otherwise exhibits an operation and benefits that are analogous to those disclosed in the prior embodiment.

In some instances, the rotational speed of the wheel powered by the motor vehicle may need to be increased to produce the maximum voltage. This can be accomplished by either a manual or an electronic adjustment to the motor vehicle accelerator pedal. A threaded rod can be positioned between the accelerator pedal and the base of the front seat and manually adjusted by a wing nut to provide additional power when required by the generator. In addition, an electronic actuator or speed control 93 acting as a governor, can be positioned on or proximate pulley 92, FIG. 1, powered by a cigarette lighter outlet and again connected operably to the accelerator pedal for providing additional power as needed. The cruise control feature of the vehicle may be used for this purpose. Accordingly, the speed of generator 14 and the power produced thereby may be controlled and adjusted as needed without a person having to remain in the vehicle with his or her tool on the accelerator pedal.

From the foregoing it may be seen that the apparatus of this invention provides for a device that converts the rotation of a motor vehicle's driven wheel into power for driving a portable electric generator so that the generator may be operated without requiring its own gasoline-powered engine. While this detailed description has set forth particularly preferred embodiments of the apparatus of this invention, numerous modifications and variations of the structure of this invention, all within the scope of the invention, will readily occur to those skilled in the art. Accordingly, it is understood that this description is illustrative only of the principles of the invention and is not limitative thereof.

Although specific features of the invention are shown in some of the drawings and not others, this is for convenience only, as each feature may be combined with any and all of the other features in accordance with this invention.

Other embodiments will occur to those skilled in the art and are within the following claims.

What is claimed is:

1. A device for powering an electric generator, said device comprising:
   a base for supporting the generator:
   an idler roller assembly including at least one load bearing idler roller mounted rotatably within said base for circumferentially engaging and supporting a driving wheel of a motor vehicle; and
   a drive roller mounted rotatably to said base for maintaining non-load bearing circumferentially tangential interengagement with the driving wheel of the motor vehicle such that rotation of the wheel causes said drive roller to axially rotate; said drive roller for operably connecting to the generator such that axial rotation of said drive roller is transmitted to the generator and the generator is operated to produce electricity; said idler roller assembly including a carriage that is movably supported in said base and further including an adjustment mechanism that is operated to adjust said carriage within said base and position said idler roller assembly a selected distance away from said drive roller that permits a driving wheel of a corresponding size to operably engage and rotate said drive roller.

2. The device of claim 1 in which said idler roller assembly includes a pair of idler rollers that are arranged parallel to one another.

3. The device of claim 1 in which said drive roller is mounted on said base above and forwardly of said idler roller assembly.

4. The device of claim 1 in which said adjustment mechanism includes a threaded element that interengages said base and said carriage and a nut fixed to one of said base and said carriage and operably engaging said threaded element such that axially turning said threaded element in a first direction adjusts said idler roller assembly toward said drive roller and turning said threaded element in an opposite second direction adjusts said idler roller assembly away from said drive roller.

5. The device of claim 1 further including a wheel size indicator system including a marker carried by one of said idler roller assembly and said base and a series of wheel size indicators attached to the other of said idler roller assembly and said base, said carriage being adjusted to align said marker with a selected wheel size indicator whereby a driving wheel having a corresponding wheel size is positionable on said idler roller assembly to operably engage and rotate said drive roller.

6. The device of claim 1 in which said base includes an outer frame and said carriage includes an inner frame slidably mounted in said outer frame.

7. The device of claim 1 further including a reduction mechanism for operably interconnecting said drive roller and the generator.

8. The device of claim 7 in which said reduction mechanism includes a first pulley attached axially to said drive roller, a second pulley attachable axially to the generator and a drive belt interconnecting said first and second pulleys.

9. The device of claim 7 further including a housing mounted on said base for enclosing said reduction mechanism.

10. The device of claim 1 further including a wheel assembly mounted rotatably to a first side of said base and a handle assembly mounted to an opposite, second side of said base, said handle for being grasped by a user of said device and said wheel assembly for engaging and rolling along an underlying surface to facilitate transport of said device.

11. The device of claim 1 further including a ramp attached to said base for supporting the driving wheel of the motor vehicle as the driving wheel is driven into engagement with said idler roller assembly.

12. An electric generator device powered by a driving wheel of a motor vehicle, said device comprising:
   an electric generator;
   a base for supporting the generator:
   an idler roller assembly including at least one load bearing idler roller mounted rotatably within said base for circumferentially engaging and supporting a driving wheel of a motor vehicle; and
   a drive roller mounted rotatably to said base for maintaining non-load bearing circumferentially tangential interengagement with the driving wheel of the motor vehicle such that rotation of the wheel causes said drive roller to axially rotate; said drive roller for operably connecting to the generator such that axial rotation of said drive roller is transmitted to the generator and the generator is operated to produce electricity; said idler roller assembly including a carriage that is movably mounted in said base and further including an adjustment mechanism that is operated to adjust said carriage within said base and position said idler roller assembly a selected distance from said drive roller that permits a driving wheel of a corresponding size to operably engage and rotate said drive roller.

13. The device of claim 12 in which said drive roller is mounted on said base above and forwardly of said idler roller assembly.

14. The device of claim 12 in which said adjustment mechanism includes a threaded element that interengages said base and said carriage and a nut fixed to one of said base and said carriage and operably engaging said threaded element such that axially turning said threaded element in a first direction adjusts said carriage and said idler roller assembly toward said drive roller and turning said threaded element in an opposite second direction adjusts said carriage and said idler roller assembly away from said drive roller.

15. The device of claim 12 in which said base includes an outer frame and said carriage includes an inner frame slidably mounted in said outer frame.

16. The device of claim 12 further including a reduction mechanism for operably interconnecting said drive roller and the generator, said reduction mechanism including a first pulley attached axially to said drive roller, a second pulley attachable axially to the generator and a drive belt interconnecting said first and second pulleys and further including a housing for enclosing said reduction mechanism.

17. The device of claim 12 further including a ramp attached to said base for supporting the driving wheel of the motor vehicle as the driving wheel is driven into engagement with said idler roller assembly.

* * * * *